Figure 1:
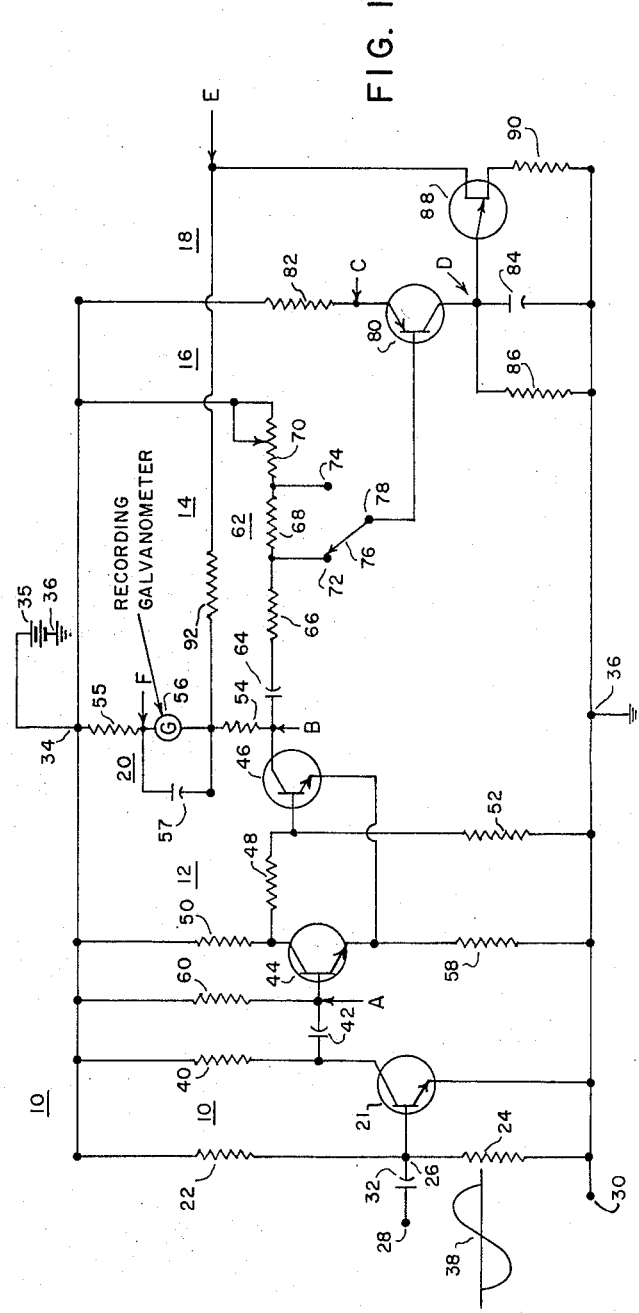

Nov. 22, 1966    J. R. REHAGE    3,287,640
PULSE COUNTING CIRCUIT WHICH SIMULTANEOUSLY INDICATES
THE OCCURRENCE OF THE $n$TH PULSE
Filed March 12, 1963

JON RICHARD REHAGE,
*INVENTOR.*

BY

*ATTORNEYS*

United States Patent Office 3,287,640
Patented Nov. 22, 1966

1

3,287,640
PULSE COUNTING CIRCUIT WHICH SIMULTANE-
OUSLY INDICATES THE OCCURRENCE OF THE
nTH PULSE
Jon Richard Rehage, Madison, Ala., assignor to the United
States of America as represented by the Administrator
of the National Aeronautics and Space Administration
Filed Mar. 12, 1963, Ser. No. 264,731
6 Claims. (Cl. 324—113)

The invention described herein may be manufactured and used by or for the Government of the United States of America for governmental purposes without the payment of any royalties thereon or therefor.

This invention relates to electrical indicating systems and particularly to a system for indicating, as by recording, each cycle or pulse of a train of pulses and a signal denoting that the $n$th pulse has occurred.

There are a number of application in which it is necessary to both examine or view each of a series or train of electrical pulses or excursions and also necessary to quickly determine, at a glance, how many of such pulses, as a total have occurred. For example, such is the case wherein both short time and long time frequency measurements are being made.

Previous known existing systems lack versatility, from the point of view of operating frequency, and are believed to require an excessive number of components. Accordingly, an object of this invention is to provide a relatively wide band indicator of the type described which features a substantial reduction in component requirements.

In accordance with the invention the signal to be observed, or input signal, is fed to a variable impedance means, such as an electrical squaring circuit, which provides across it a variation in impedance which varies at the rate of the input signal but between fixed amplitude limits. This variable impedance means is connected in series with indicating means such as a recording galvanometer and a source of current. In this manner each cycle of the input signal actuates the galvanometer as square or rectangular current variations occur due to the controlled variations of the impedance means. Voltage variations which result from this configuration are coupled from the variable impedance means to a resistance-capacitance differentiation circuit which in turn provides a spike pulse output to an electrical integrating circuit. The electrical integrating circuit provides a narrow width voltage output which is proportional in amplitude to the number of input pulses which have occurred. This output is applied to a voltage sensitive impedance means, such as a unijunction transistor, which abruptly changes impedance whenever it is fed a voltage of a certain level. This latter impedance means is placed in circuit with the indicating means and the variable impedance means described above, and thus changes in current through the indicating means correspond to both changes, the square wave and abrupt variations in impedance to produce a dual output from the indicator means. This dual output provides an indication of each cycle of the input signal and also an indication that a predetermined number of such cycles have occurred. By appropriate adjustment, or selection of the output from the differentiation means, this number can be chosen as desired for convenience of counting, e.g., every five or ten cycles.

Figure 2:
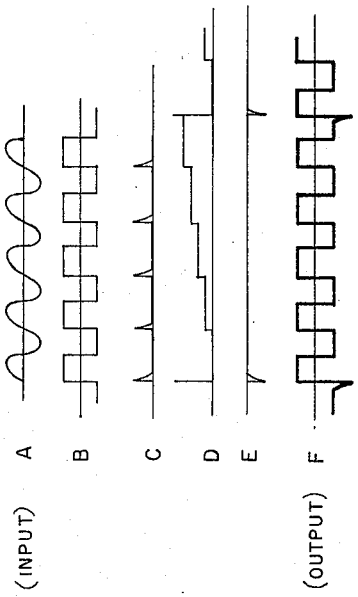

Other objects and features of the present invention will be apparent from the following detailed description when considered together with the accompanying drawings in which:

FIGURE 1 is an electrical schematic diagram of an embodiment of the invention; and FIGURE 2 is a graphical illustration showing a series of curves descriptive of operation of the embodiment of the invention shown in FIGURE 1.

The embodiment of the invention shown in FIGURE 1 consists basically of preamplifier 10, squaring circuit 12, differentiation circuit 14, integration circuit 16, abrupt impedance changing circuit 18 and indicator circuit 20.

Preamplifier 10 is a transistor amplifier stage employing as an active element transistor 21 (e.g., 2N244). The base of transistor 21 is biased by means of a voltage divider network consisting of voltage dropping or current limiting resistor 22 (e.g., 82K ohms) and input resistor 24 (e.g., 8.2K ohms) connected in series at terminal 26 and terminal 26 connects to the base of transistor 21. Input to the circuit is applied across terminals 28 and 30 and is fed through capacitor 32 (e.g., 10 mf.) to the base of transistor 21. Plus terminal 34 of bias source 35 is connected to a terminal of resistor 22 and the negative terminal of source 35 connects to a common ground terminal 36, as does the emitter of transistor 21.

With the application of an alternating current input 38, an amplified replica of the input appears across load resistor 40 (e.g., 2K ohms) connected between the collector of transistor 21 and source terminal 34. The output of transistor 21 is coupled through capacitor 42 (e.g., 10 mf.) to the base input of transistor 44 (e.g., 2N244) of squaring circuit 12. The wave-form of the input to transistor 44, occurring at point A is illustrated as curve A of FIGURE 2. Squaring circuit 12 includes additionally transistor 46 (e.g., 2N244), and the base input of transistor 46 is directly connected through resistor 48 (e.g., 10K ohms) to the collector output of transistor 44. Collector resistor 50 (e.g., 2K ohms), connecting source terminal 34 with the collector of transistor 44, and input resistor 52, connecting between ground and the base of transistor 46, complete a voltage divider circuit between source plus terminal 34 and ground terminal 36. The output, or load circuit of squaring circuit 12 is through resistor 54 (e.g., 2K ohms), resistor 55 (e.g., 330 ohms) and recording galvanometer 56 interconnecting positive source terminal 34 and the collector of transistor 46. Damping or filtering of undesired transient response is provided by capacitor 57 across galvanometer 56. Transistors 44 and 46 are regeneratively coupled through common emitter resistor 58 (e.g., 500 ohms) connecting the emitters of transistors 44 and 46 to ground terminal 36.

With no signal applied to the input of squaring circuit 12 at point A, the bias applied to the base of transistor 44 through resistor 60 (e.g., 15K ohms) is such that transistor 44 is in a cutoff condition and thus the collector voltage of transistor 44 is approximately equal to the supply voltage appearing at terminal 34. This voltage, which is positive, is coupled to the base of transistor 46 through resistor 48, and the voltage appearing at the base of transistor 46 is across resistor 52. This voltage is significantly positive and the resulting current flow through the base-emitter circuit of transistor 46 is sufficient to hold transistor 46 in an "on" condition with the voltage at the collector of transistor 46 being near ground potential. This, of course, accompanies a substantial current flow through transistor 46 and common emitter resistor 58 with the result that the emitter of transistor 44 is held at a sufficiently high positive value to hold transistor 44 in a cutoff state.

As the amplified input voltage wave-form, illustrated in curve A of FIGURE 2, rises in a positive direction, a point is reached where base-emitter current starts to flow in transistor 44 and transistor 44 starts to turn on. The results are regenerative in that as transistor 44 starts to turn on, the collector voltage of transistor 44 drops, the base potential of transistor 46 drops producing a decrease in current flow through transistor 46 and emitter resistor 58. With the reduced voltage drop across resistor 58, the emitter of transistor 44 becomes less positive causing greater current flow between the base and emitter of transistor 44 and it turns on quite abruptly. The converse occurs to transistor 46 and it urns off abruptly as illustrated by curve B in FIGURE 2 showing the collector wave-form of transistor 46, in contrast to the concurrent approximately sine wave input wave-form A. As galvanometer 56 is connected in series with the collector of transistor 46, the current flow through galvanometer 56 follows the wave-form shown at point B and will provide as an output a square wave with regular or irregular inputs 38.

Circuitry subsequent to squaring circuit 12 generates Nth pulse signals in response to the output of transistor 46. Differentiation circuit 14 receives the output of transistor 46 and consists of voltage divider 62 and capacitor 64, e.g., (.002 mf.) connected in this order between terminal 34 and the collector of transistor 46. Voltage divider 62 consists of fixed value resistors 66 (e.g., 2.2K ohms) and 68 (e.g., 1.5K ohms) and variable resistor 70 (e.g., 2.5K ohms), all connected in series and providing output voltage taps at terminals 72 and 74 which are selectively contacted by switch 76 to provide an output of either voltage divider terminal at switch terminal 78. The output of differentiation circuit 14, appearing at terminal 78 and at point C is a series of spiked shaped pulses (wave-form C of FIGURE 2) of an amplitude dependent upon whether switch 76 is in contact with terminal 72 or 74, the higher amplitude being obtainable when switch 76 is in contact with terminal 72. It is to be noted that the amplitude of the spiked outputs of differentiation circuit 14 are independent of the amplitude of the input voltage 38 inasmuch as squaring circuit 12 produces an output at point B which is of a constant amplitude.

Integrating circuit 16, which responds to the output of differentiation circuit 14, consists basically of transistor 80 (e.g. 2N525) which passes a charging pulse of current from terminal 34 through emitter resistor 82 (e.g. 68 ohms) to storage capacitor 84 (e.g. .5 mf.) connected between the collector of transistor 80 and ground terminal 36, in response to a spike pulse from differentiating circuit 14. The amplitude of the charging pulse is a function of the amplitude of the spike pulse applied to the base of transistor 80 and is dependent upon whether switch 76 is connected to terminal 72 or 74 of differentiating circuit 14. With no signal input to transistor 80, the emitter-base bias of transistor 80 is a function of the relative values of the emitter and base biasing resistance paths. The emitter resistance path is made up of resistor 82 and the base resistance path consists of either resistor 70 or resistor 70 and 68, depending upon the position of switch 76. In either position, however, the relative paths are such that the emitter voltage of transistor 80 is less positive than the base of transistor 80, to hold transistor 80 in a cutoff condition unless a signal input is applied to the base of transistor 80. Resistor 86 (e.g. 390K ohms) is of a very high value and provides a small current leakage path across capacitor 84.

The operation of circuit 16 is best illustrated by examination of curves C and D in FIGURE 2, representing the voltages appearing at points C and D in FIGURE 1.

Wave-form C is simply an amplified wave-form of the output of differentiating circuit 14 and is a series of spikes of an amplitude depending upon the amplitude of the input applied to the base of transistor 80 by differentiation circuit 14. Wave form D, the potential across capacitor 84, illustrates the progressive charging of capacitor 84 with the application of each current spike C. In other words, wave-form D is the integral of wave-form C.

Abrupt impedance changing circuit 18 consists of unijunction transistor 88 (e.g. 2N492) and resistors 90 (e.g. 39 ohms) and 92 (e.g. 1K ohms) connected in series with the base terminals of transistor 88, resistor 90 being between an input base terminal of transistor 88 and ground and resistor 92 being connected between the other, or output base terminal and the interconnection between galvanometer 56 and resistor 54. By virtue of these connections it will be noted that there is an impedance path between terminals 34 and 36 through galvanometer 56 and transistor 88 which essentially parallels the impedance path through transistor 46, and resistors 54 through 58, between galvanometer 56 and ground. Unijunction transistor 88 has the characteristic to maintain a relatively high impedance until a critical emitter-base potential is reached at which point its base-to-base impedance drops substantially. Its operation here is such that when the potential on capacitor 84, as illustrated by curve D, reaches a critical level there is a very sudden decrease in resistance in the emitter-base circuit of transistor 88 and a spike of current as illustrated in curve E serves to discharge capacitor 84. This also has the effect of producing a sudden surge of current in the base-to-base circuit of transistor 88 producing a sudden drop in current through resistor 92 and galvanometer 56. This is illustrated in curve F in FIGURE 2 showing the total output registered by galvanometer 56. Here it will be observed that with every fifth cycle there occurs a spike essentially superimposed upon the output shown in curve B, or a composite of the outputs of abrupt impedance changing circuit 18 and squaring circuit 12. The rate of output from circuit 18 is, of course, dependent upon the position of switch 76 and the values of the resistors of voltage divide 62. With the values heretofore indicated and with switch 76 in circuit with terminal 72, there is an output of abrupt impedance changing circuit 18 for every fifth input cycle. In the alternate position of switch 76, there will be an output of circuit 18 every 10 cycles.

Obviously, many modifications and variations of the present invention are possible in the light of the above teachings. It is, therefore, to be understood that within the scope of the appended claims the invention may be practiced other than as specifically described.

I claim:
1. In combination:
  a. a voltage source having first and second terminals;
  b. indicating means connected in series with said source terminals for indicating the magnitude of current passing through said indicating means;
  c. first current control means including a first transistor connected in series with said indicating means between said source terminals;
  d. an input signal comprising a source of periodic varying voltage;
  e. first transistor biasing means responsive to said input signal and coupled to said first transistor for abruptly varying the conduction of said first transistor from substantially fully conductive to substantially non-conductive once each cycle of said input signal so as to cause said first transistor to develop an output between fixed amplitude limits;
  f. electrical differentiation means comprising a capacitor and electrical resistance in series having the free end of the capacitor coupled to the junction of said indicating means and said first transistor and the free end of the resistor coupled to one of said voltage source terminals for providing a pulse of current for each cycle of varying conduction of said first transistor;
  g. second current control means including impedance means connected in series with said indicating means between said source terminals and responsive to an electrical input for producing an abrupt change in impedance;
  h. integrating control means responsive to the output of said differentiation means for providing an electrical input to said impedance means in response to a predetermined number of said pulses from said differentiation means.
2. The combination set forth in claim 1 wherein said integrating control means comprises a second capacitor and switching means coupled to the output of said differentiation means for applying pulses of charging current to said second capacitor and including means for providing a triggering input from said second capacitor to said impedance means in response to a predetermined number of said pulse from said differentiation means.

3. The combination set forth in claim 2 wherein said switching means comprises a switching transistor and emitter load resistor, said second capacitor being connected between the collector of said switching transistor and said second terminal of said source, said emitter load resistor being connected between the emitter of said switching transistor and said first terminal of said source, the base terminal of said switching transistor being connected to an electrical point along said electrical resistance of said differential means, and said first terminal of said source and said emitter of said switching transistor being of like polarity designation.

4. The combination set forth in claim 3 wherein said impedance means is a unijunction transistor and the base terminals of said unijunction transistor form the impedance terminals of said impedance means and the emitter terminal of said unijunction transistor is connected to the collector terminal of said switching transistor.

5. The combination set forth in claim 4 wherein said electrical resistance of said differentiating means is of adjustable value and wherein there are a plurality of electrical taps at different resistance points on said electrical resistance, and means for selectively coupling said base terminal of said switching transistor to one of said electrical taps.

6. The combination set forth in claim 5 wherein said recording means of said indicating means is a recording galvanometer.

References Cited by the Examiner

UNITED STATES PATENTS 2,873,388   2/1959   Trumbo.
2,926,984   3/1960   Gerbrands _____ 346—62 X
3,111,591   11/1963   Conron _____ 307—88.5-21.1

OTHER REFERENCES

L. E. Weisner, Transistor Count-Rate Systems, Electrical Engineering, vol. 17, No. 7, July 1958, pp. 623–625.

WALTER L. CARLSON, *Primary Examiner.*

RUDOLPH V. ROLINEC, *Examiner.*

J. J. MULROONEY, *Assistant Examiner.*